United States Patent
Yellin et al.

(10) Patent No.: US 7,337,201 B1
(45) Date of Patent: Feb. 26, 2008

(54) SYSTEM AND METHOD TO INCREASE MEMORY ALLOCATION EFFICIENCY

(75) Inventors: Frank N. Yellin, Redwood City, CA (US); Ioi Lam, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 418 days.

(21) Appl. No.: 10/933,569

(22) Filed: Sep. 2, 2004

Related U.S. Application Data (60) Provisional application No. 60/509,784, filed on Oct. 8, 2003.

(51) Int. Cl.
*G06F 17/30* (2006.01)
(52) U.S. Cl. ...................... 707/206; 711/118
(58) Field of Classification Search ................ 707/206, 707/2
See application file for complete search history.

(56) References Cited

U.S. PATENT DOCUMENTS 5,566,321 A * 10/1996 Pase et al. ................. 711/153
6,594,749 B1 * 7/2003 Czajkowski ................ 711/170
6,681,306 B1 * 1/2004 Kessler et al. ............. 711/171

OTHER PUBLICATIONS

Gottry, Ken. "Pick up Performance with Generational Garbage Collection", Jan. 11, 2002, Java World, 1-13□□Appel, Andrew. "Simple Generational Garbage Collection and Fast Allocation", Princeton University, Mar. 1988, 1-16.*

* cited by examiner

*Primary Examiner*—Pierre Vital
*Assistant Examiner*—Yuk Choi
(74) *Attorney, Agent, or Firm*—Martine Penilla & Gencarella, LLP (57) ABSTRACT

A method of managing a memory heap includes allocating a first portion of the memory heap to a young section. The first portion having a faster access time than at least one of a second portion and a third portion of the memory heap. The second portion being allocated to a tenured section and the third portion including an unused section. The method also includes filling the young section with objects from an application and deleting any objects in the young section that are no longer referenced. Any referenced objects are shifted. A memory system is also described herein.

10 Claims, 5 Drawing Sheets

SYSTEM AND METHOD TO INCREASE MEMORY ALLOCATION EFFICIENCY

CROSS REFERENCE TO RELATED APPLICATIONS

This application claims priority from U.S. Provisional Patent Application No. 60/509,784 filed on Oct. 8, 2003 and entitled "System and Method to Increase Memory Allocation Efficiency," which is incorporated herein by reference in its entirety.

BACKGROUND OF THE INVENTION

1. Field of the Invention

The present invention relates generally to memory usage, and more particularly, to methods and systems for efficiently allocating memory.

2. Description of the Related Art

Computer memory systems are used to store objects that are being used by one or more applications running on the computer. Typically, most of these objects (e.g. 75-95%) have a relatively short period of time in which they are used. Some of these objects (e.g., 5-25%) have a relatively longer period of time in which they are used and therefore should ideally be maintained in the computer memory system so that these objects are readily available to the on-going applications. Computer memory systems are regularly and routinely purged of such unused objects to ensure the unused objects do not needlessly consume precious memory capacity. This purging process is typically referred to as a garbage collection scheme.

In a typical, generational, garbage collection scheme the memory heap is divided into three sections. A first section of the memory heap is allocated as a tenured section. An adjacent, second section is allocated as a young section and a third section of the memory heap is an unused space section. The tenured section includes memory objects that have survived at least one prior garbage collection. The tenured section is typically in a single contiguous block. The young section includes memory objects that have been allocated since the immediate prior garbage collection process. The young section is also typically in a contiguous block. The unused space section is the memory space that does not belong to either of the two section types above.

The young section is placed in the addresses that immediately follow the tenured section. By way of example, the tenured section may be in addresses 0 to 1000 and the young section is located in addresses 1001 to 3000. The unused space section falls into the remaining portion of the memory heap, subsequent to the young section.

Initially, applications fill the young section with objects. When the young section is filled with objects, a garbage collection scheme is applied to the young section. During each iteration of the garbage collection process, the objects in the current young section are examined and those objects that are no longer referenced are deleted. Those objects that are still referenced are shifted into the tenured section. Each iteration of the garbage collection enlarges the tenured section.

As the tenured section is enlarged, the young section is continuously shifted to higher memory addresses (i.e., those addresses immediately following the ever enlarged tenured section). When the tenured section becomes so large that the combination of the young section and the tenured section consume a preselected portion of or the entire memory heap (i.e., the unused space section approaches a predetermined minimum limit) then, the garbage collection is applied to both the young section and the tenured section. The garbage collection then deletes those objects that are no longer referenced in both the young section and the tenured section. All of the remaining objects are shifted downward to create a new tenured section. As a result, additional memory space is freed up for subsequent operations.

By way of example, initially a 1 megabyte tenured section is allocated and an immediately adjacent 1 megabyte is allocated to young section. The applications begin to use the young section. When the young section is filled with objects, then the garbage collection scheme is applied to the young section and approximately 75-95% (e.g., 750-950 k) of objects are deleted from the young section. The remaining 50-250 k of objects are then shifted into the tenured section. In subsequent iterations of the garbage collection the tenured section will be filled. Once the tenured section is filled, the 50-250 k of objects that remain in the young section are shifted downward and appended to the tenured section to form the enlarged tenured section having a 1.05-1.25.megabyte size.

The above process continues iteratively until the size of the unused section becomes smaller than a set parameter (e.g., zero). A garbage collection scheme is then applied to the both the enlarged tenured section and the young section to eliminate unused objects from the enlarged tenured section and young section and thereby reduce the memory space consumed by the objects to less than the originally allocated tenured section size (e.g., 1 megabyte).

By way of example, typically the enlarged tenured section and the young section will be reduced by about 75-95% so that the tenured section can be reallocated to only 1 megabyte. The process can then begin again to fill the tenured section and then fill and garbage collect the young section as described above.

While a typical garbage collection scheme can manage the consumption of memory, the young section presents moving targets as the size of the tenured section varies. In view of the foregoing, there is a need for a system and a method for garbage collection where the respective locations of the young section and the tenured space are set and do not present a moving target and therefore can be more efficiently used.

SUMMARY OF THE INVENTION

Broadly speaking, the present invention fills these needs by providing an improved garbage collection scheme. It should be appreciated that the present invention can be implemented in numerous ways, including as a process, an apparatus, a system, computer readable media, or a device. Several inventive embodiments of the present invention are described below.

One embodiment provides a method of managing a memory heap includes allocating a first portion of the memory heap to a young section. The first portion having a faster access time than at least one of a second portion and a third portion of the memory heap. The second portion being allocated to a tenured section and the third portion including an unused section. The method also includes filling the young section with objects from an application and deleting any objects in the young section that are no longer referenced. Any referenced objects are shifted.

The deleting any objects in the young section that are no longer referenced can include analyzing the memory heap to determine if the unused section is filled. If the unused section is filled, then any objects in either of the young section and the tenured section that are no longer referenced can be deleted. If the unused section is not filled, then any objects in the young section that are no longer referenced can be deleted.

The young section can include a fixed beginning memory address. The young section can include a beginning memory address higher than a last memory address in the tenured section. The unused section can be filled if the unused section has less than a predefined minimum available unused section size.

Shifting the referenced objects can include shifting the referenced objects to the tenured section. Shifting the referenced objects can include shifting the referenced objects to a beginning of the tenured section. Shifting the referenced objects can also include shifting the referenced objects in the young section to a beginning of the young section. Shifting the referenced objects in the young section to the beginning of the young section can include determining if a sufficient space is available in the young section. If the sufficient space is available in the young section, then the referenced objects in the young section can be shifted to the beginning of the young section. If the sufficient space is available is not available in the young section, then the referenced objects can be shifted to the tenured section.

The method can also include determining if the unused section is filled and if the unused section is filled then deleting any objects in the tenured section that are no longer referenced and shifting the referenced objects to the tenured section.

Another embodiment provides a method of performing an improved garbage collection in a memory heap. The method includes allocating a first portion of the memory heap to a young section. The first portion having a faster access time than at least one of a second portion and a third portion. The second portion being allocated to a tenured section and the third portion including an unused section. The young section can be filled with objects from an application. Any objects in the young section that are no longer referenced can be deleted. The young section can be analyzed to determine if the young section has a sufficient space available. If the young section has the sufficient space available then any referenced objects can be shifted to a beginning of the young section. If the young section does not have the sufficient space available then any referenced objects can be shifted to the tenured section.

Shifting any referenced objects to the tenured section can include analyzing the memory heap to determine if the unused section is filled. If the unused section is filled, then any objects in the tenured section that are no longer referenced can be deleted. The young section can include a fixed beginning memory address.

Yet another embodiment provides a computer memory system. The memory system includes a first portion, a second portion and a third portion of a memory heap. The first portion having a faster access time than at least one of the second portion and the third portion. The computer memory system also includes a memory management unit capable of mapping a young section to the first portion and logic for applying an improved garbage collection algorithm on the computer memory system.

The logic for applying the improved garbage collection algorithm on the computer memory system can include logic for allocating the first portion of the memory heap to a young section. The first portion having a faster access time than at least one of the second portion and the third portion, the second portion being allocated to a tenured section and the third portion including an unused section. Logic for filling the young section with objects from an application is also included. Logic for analyzing the memory heap to determine if the unused section is filled is also included. If the unused section is filled, then any objects in the young section or the tenured section that are no longer referenced can be deleted. If the unused section is not filled, then any objects in the young section that are no longer referenced can be deleted. Logic for shifting any referenced objects is also included.

The first portion can be a cache memory. A first virtual memory address in the first portion has a higher virtual address than highest virtual memory address in the second portion. The memory management unit includes the capability of managing a plurality of discontiguous memory portions of the memory heap into an apparent contiguous memory heap. The young section can include a fixed beginning memory address.

Still another embodiment provides a method of managing a memory heap. The method includes allocating a first portion of the memory heap to a young section. The young section having a substantially fixed beginning address. The young section is filled with objects from an application. Any objects in the young section that are no longer referenced can be deleted and any referenced objects can be shifted.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION OF THE EXEMPLARY EMBODIMENTS

Several exemplary embodiments for a system and method to increase memory allocation efficiency will now be described. It will be apparent to those skilled in the art that the present invention may be practiced without some or all of the specific details set forth herein.

As described above, the prior art garbage collection caused a less than ideal allocation of the memory heap. One embodiment of the present invention provides an improved garbage collection GC scheme or algorithm where the tenured section and the young section each have respective fixed first memory addresses.

Figure 1:
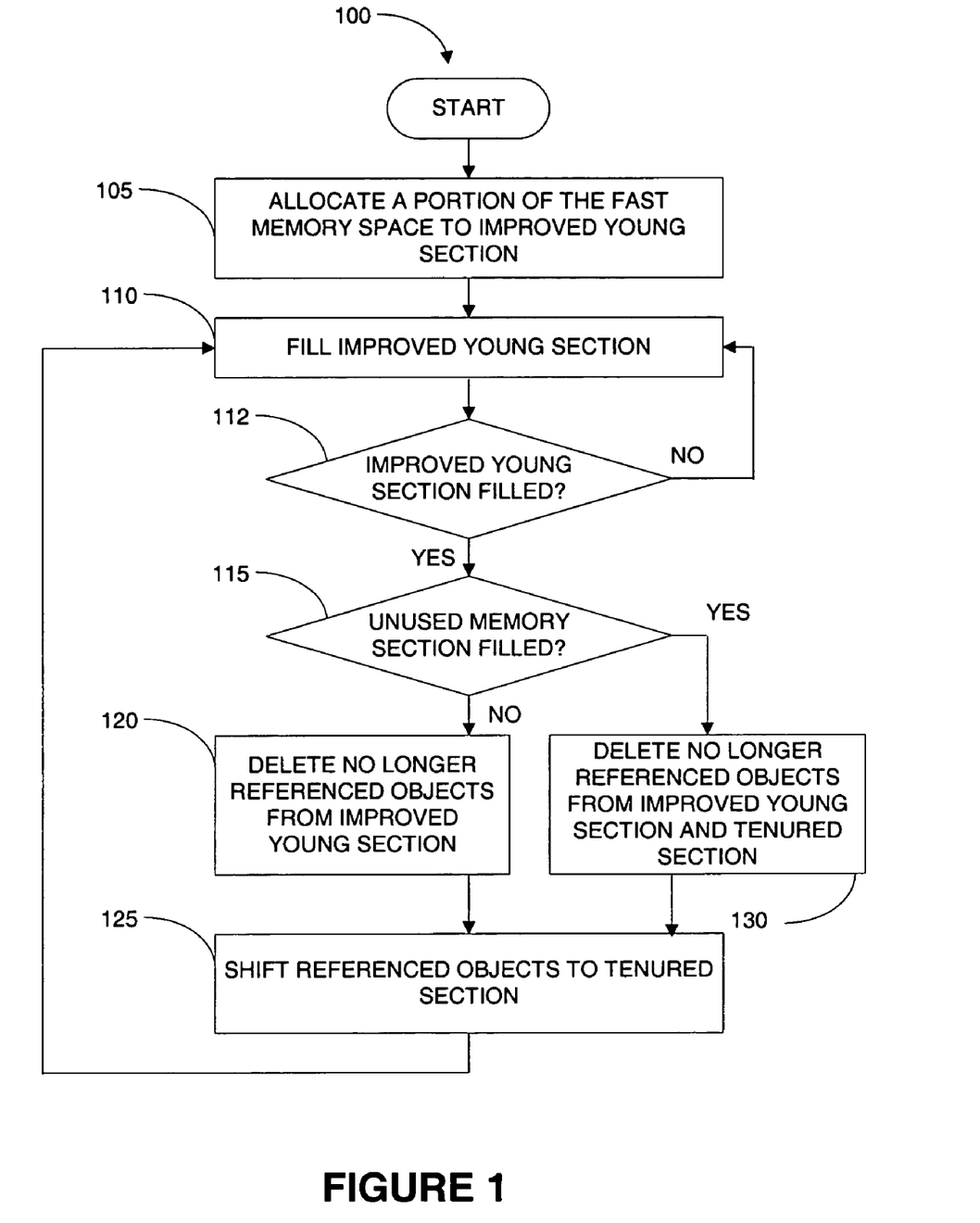
FIG. 1 is a flowchart diagram of the method operations of an improved garbage collection algorithm, in accordance with one embodiment of the present invention.
Figure 2A:
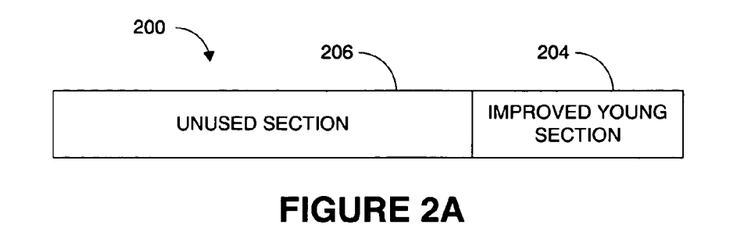
FIGS. 2A-2D show diagrams of the memory heap as the sections of the memory are filled and the garbage collection is applied, in accordance with one embodiment of the present invention.

FIG. 1 is a flowchart diagram of the method operations 100 of an improved garbage collection algorithm, in accordance with one embodiment of the present invention. FIGS. 2A-2D show diagrams of the memory heap 200 as the sections of the memory are filled and the garbage collection is applied, in accordance with one embodiment of the present invention. In an operation 105 and as shown in FIG. 2A, a portion of the memory heap 200 is allocated to an improved young section 204. A remaining, unallocated portion of the memory heap 200 is referred to as an unused space or unused section 206. A tenured section 202 may not yet be allocated as an initial garbage collection process has not yet occurred, however, it should be understood that the tenured section can be allocated at any time in the method operations 200. The improved young section 204 is in a portion of the memory having faster access memory devices so as to allow an application faster access to the objects stored therein.

In operations 110 and 112, the allocated improved young section 204 is filled as the memory heap 200 is used by an application running on the host processing system. Once the improved young section 204 is filled, the memory heap 200 is analyzed in an operation 115. In operation 115, the memory heap 200 is analyzed to determine if the unused memory section 206 is filled (e.g., has achieved a predefined minimum available unused memory section size). If, in operation 115, the unused memory section 206 is not filled, then the method operations continue in operation 120 below. Alternatively, if in operation 115, the unused memory section 206 is filled, then the method operations continue in operation 130 below.

Figure 2B:
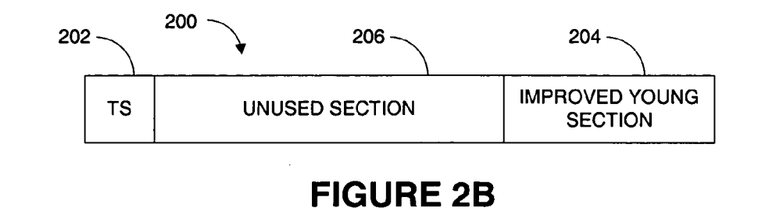
Figure 2C:
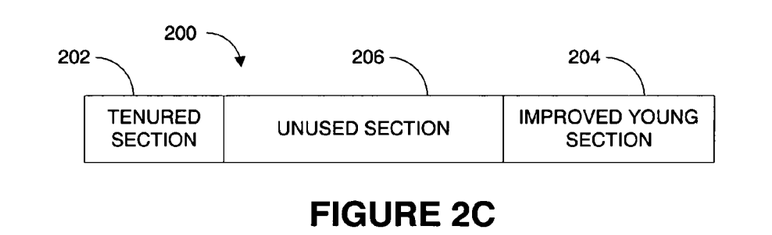
Figure 2D:
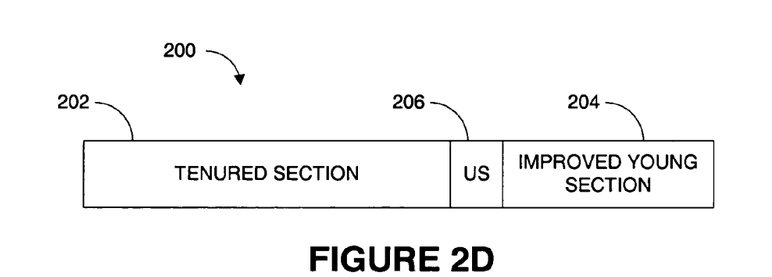

In an operation 120, those objects in the young section 204 that are no longer referenced are deleted. In operation 125, those objects in the young section 204 that are still referenced are shifted to a portion of the memory heap allocated to a tenured section 202 as shown in FIG. 2B. As described above, any of operations 105-125 can include allocating the portion of the memory heap to the tenured section. It should be understood that the portion of the memory heap allocated to the tenured section 202 and young section 204 cannot include common memory locations. The method operations then continue in operation 110 as described above. In subsequent iterations of operations 120 and 125, the unused section 206 become consumed by the tenured section 202 as shown in FIGS. 2C and 2D.

In an operation 130, the objects that are no longer referenced, in both the tenured section 202 and the young section 204, are deleted. The method operations then continue in operation 125 described above.

Typically, the objects stored in the young section 204 are those objects that are used relatively more often than those objects in the tenured section. A typical memory heap includes portions of memory having several different access speeds. The slower access speed memory is typically at the lower memory addresses, where the tenured section is typically allocated. The higher memory addresses are typically the faster access memory. Referring again to the prior art garbage collection algorithm, as the tenured section is enlarged the young section is shifted upward toward and eventually into the faster memory types. Therefore, in the prior art, as the tenured section grows larger, the objects in the young section can be accessed faster from the faster memory. While this has some benefits, it also causes the access performance of the young section to degrade when the memory heap is not as full (i.e., when the tenured section is at it's smallest).

Figure 2E:
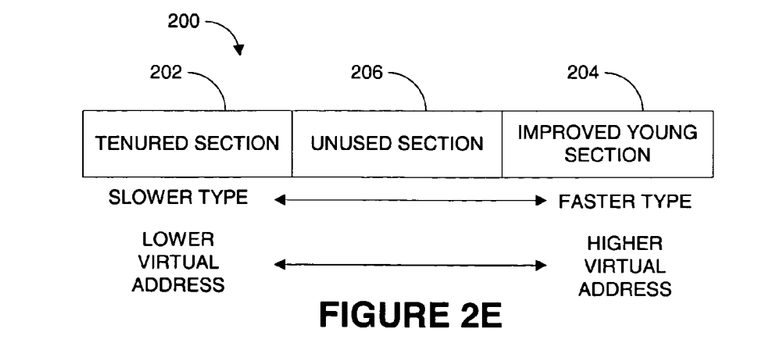
FIG. 2E is a diagram of an optimized memory heap, in accordance with one embodiment of the present invention.

FIG. 2E is a diagram of an optimized memory heap 200, in accordance with one embodiment of the present invention. The optimized memory heap 200 includes multiple types of read/writeable memory (e.g., cache, fast access random access memory (RAM), slower types of RAM, flash memory, etc.) The improved young section 204 is allocated in the fastest (i.e., fastest access time) portion(s) of the memory heap 200. The tenured section 202 is allocated in some of the slower (i.e., slower access time) portion(s) of the memory heap 200. This optimized memory heap 200 also uses a memory management unit to manage the multiple discontiguous memory portions of the memory heap into an apparent contiguous memory heap. An Intel X-scale microprocessor is an example of a microprocessor that includes such a memory management unit. The memory management unit allows, for example that a portion of virtual memory (e.g., the young section 204) can be mapped into a very fast portion of the memory heap (e.g., cache memory).

Figure 3:
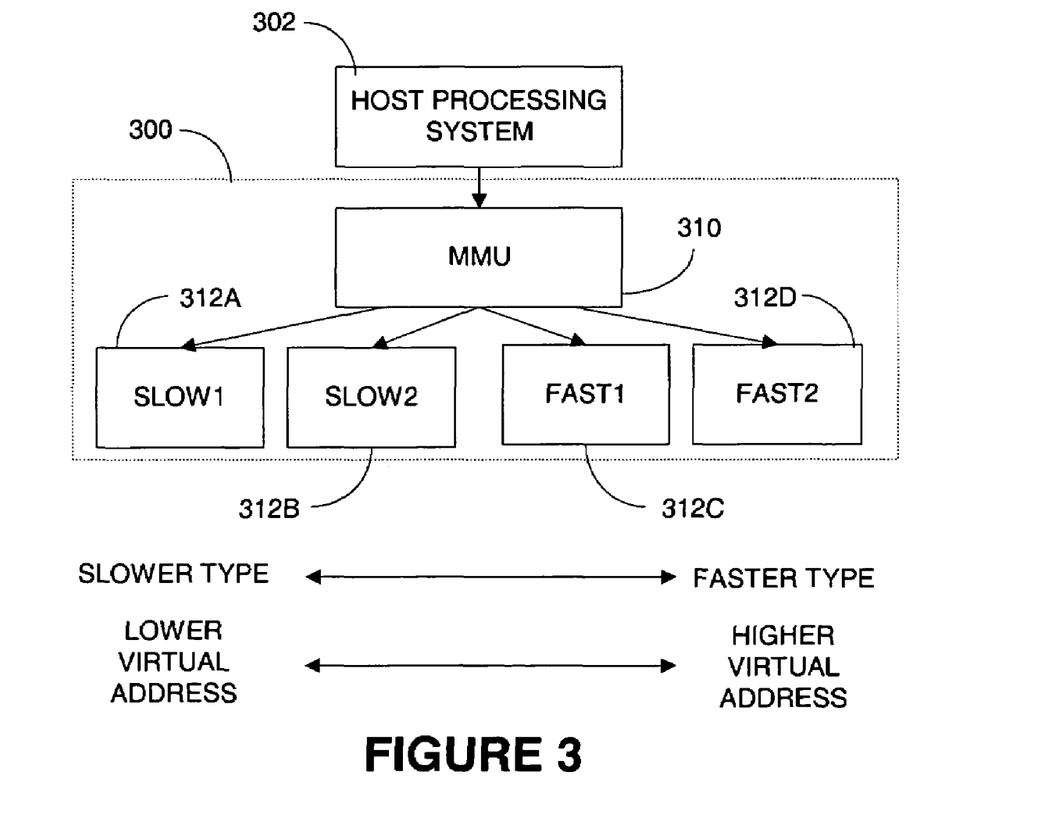
FIG. 3 is a block diagram of a memory heap in accordance with one embodiment of the present invention.

FIG. 3 is a block diagram of a memory heap 300 in accordance with one embodiment of the present invention. A host processing system 302 accesses the memory heap 300 though a memory management unit (MMU) 310. The MMU 310 provides virtual addresses to the various portions 312A-D of memory locations included in the memory heap 300. The MMU 310 provides a memory map memory of different types (e.g., speeds) to a single contiguous block such as shown in FIG. 2 above.

Because the MMU 310 creates a memory map, the slower memory can be grouped together and assigned a lower virtual address. In addition, faster memory can be grouped together at a higher virtual address. Thereby, the two or more types of memory can form a virtual contiguous block. The improved young section is placed at the high end of this contiguous block, in the faster type of memory.

In contrast to the typical garbage collection algorithm, in the improved garbage collection algorithm the young section begins at a substantially fixed address and is not shifted as the tenured section expands. The young section is substantially fixed at a high virtual address, where the faster memory is mapped. This provides a performance advantage as the objects in the young section are accessed much more frequently than objects in tenured section. Thus, the improved garbage collection algorithm substantially reduces the average object memory access time, when compared to the typical garbage collection algorithm.

In addition, in processing systems that include an MMU, such as described in FIG. 3 above, shifting the young section can be a very inefficient process. Since the MMU 310 includes a memory map of the young section and the tenured section, if either of the sections are moved, the entire memory map must be updated. Updating the memory map can interrupt or otherwise stall the accesses to the memory heap 300 by the host processing system.

Figure 4:
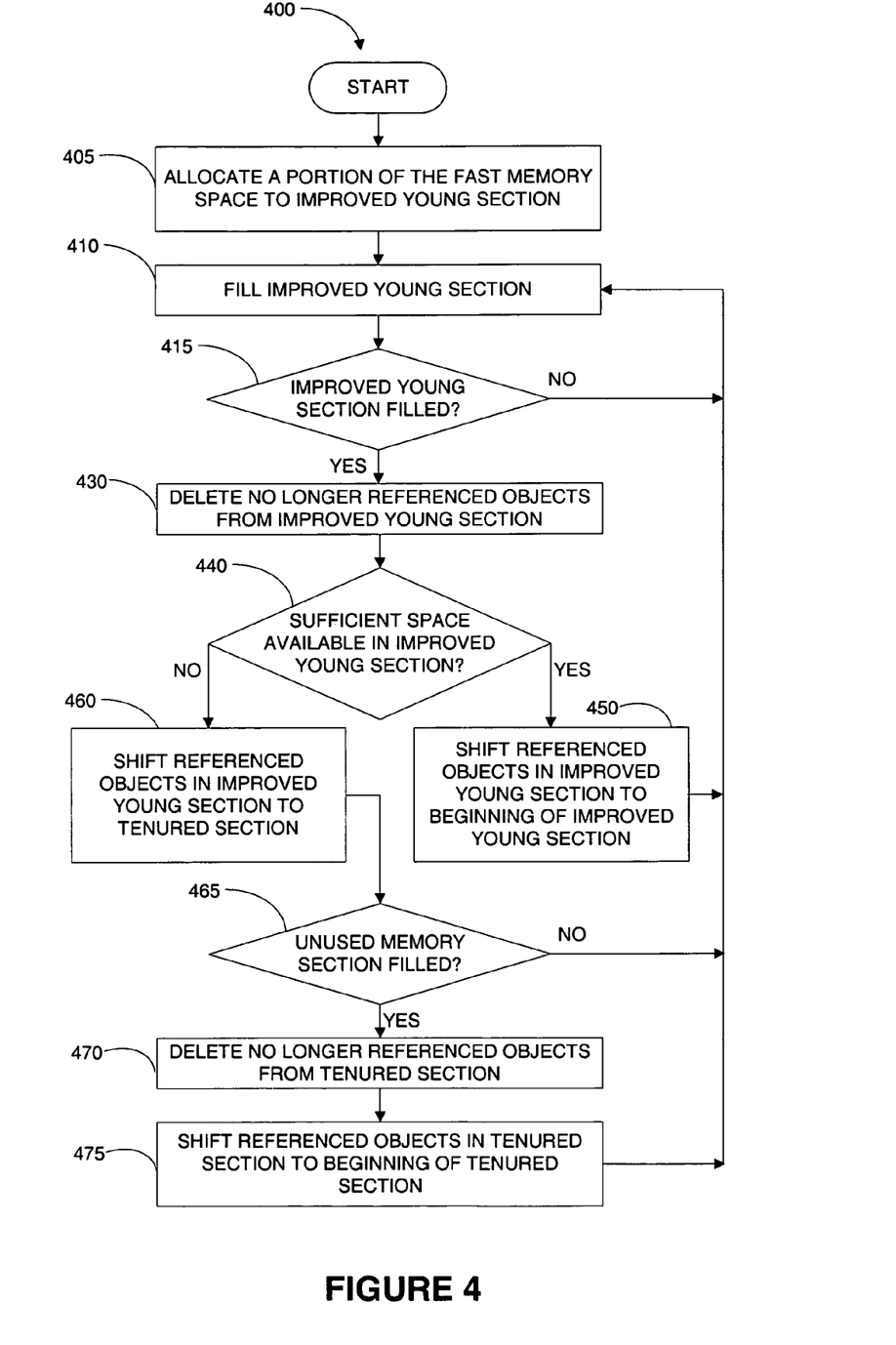
FIG. 4 is a flowchart diagram of the method operations of another improved garbage collection algorithm, in accordance with one embodiment of the present invention.
Figure 5A:
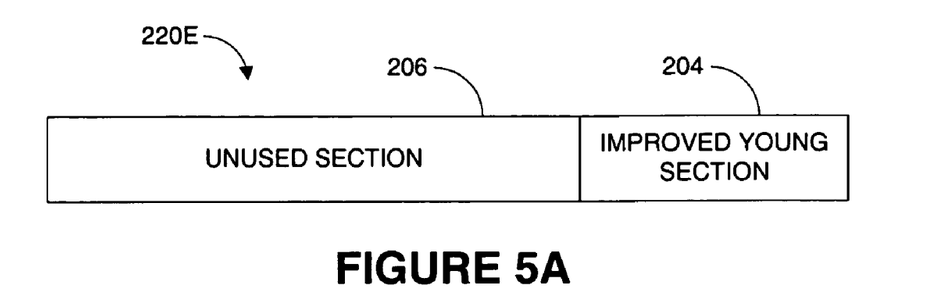
FIGS. 5A-5D show diagrams of the memory heap as the sections of the memory are filled and the garbage collection is applied, in accordance with one embodiment of the present invention.

FIG. 4 is a flowchart diagram of the method operations 400 of another improved garbage collection algorithm, in accordance with one embodiment of the present invention. FIGS. 5A-5D show diagrams of the memory heap 200 as the sections of the memory are filled and the garbage collection is applied, in accordance with one embodiment of the present invention. In an operation 405 and as shown in FIG. 5A, a portion of the memory heap 200 is allocated to an improved young section 204. A tenured section 202 may not yet be allocated as an initial garbage collection process has not yet occurred, however, it should be understood that the tenured section can be allocated at any time within the method operations 400, as the tenured section is needed.

In operations 410 and 415, the allocated improved young section 204 is filled as the memory heap 200 is used by an application running on the host processing system. In an operation 430, once the improved young section 204 is filled, the young section is analyzed and any objects in the young section 204 that are no longer referenced are deleted.

In an operation 440, the young section 204 is analyzed to determine if a sufficient quantity of space is available in the young section. The sufficient quantity of space 204' can be a preselected quantity or a percentage or any other type of setting that can be determined. If the sufficient space 204' is not available in the young section 204, then the method operations continue in operation 460 below. Alternatively, if the sufficient space is available in the young section 204, then the method operations continue in operation 450 below.

Figure 5B:
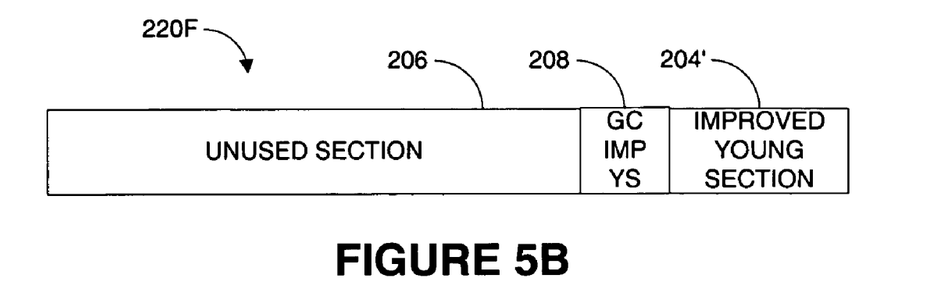

In an operation 450, the referenced objects 208 remaining in the young section 204 are shifted to the beginning of the young section as shown in FIG. 5B. The method operations then continue in operation 410, as described above. By way of example, if the young section 204 is allocated to memory addresses 10000-15000, then the referenced objects remaining in the young section are shifted to the memory addresses beginning at memory address 10000.

Figure 5C:
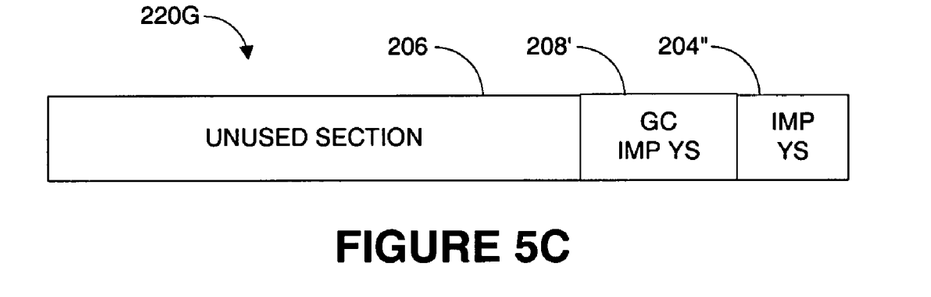

In successive iterations of operations 410-450 continue to fill the young section 204 with an ever-larger set of remaining referenced objects 208' and the space 204" remaining in the young section is filled with new objects by the application(s) running on the host computing system, as shown in FIG. 5C.

Figure 5D:
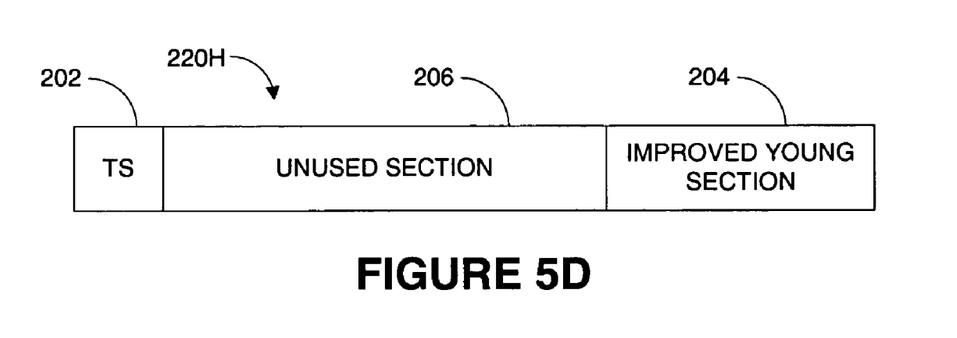

In an operation 460, the referenced objects in the young section are shifted to a portion of the memory heap allocated to a tenured section 202, as shown in FIG. 5D, and the method operations continue in operation 465. The tenured section 202 can be allocated to slower access speed memory devices because the tenured section is not accessed as often as those objects in the young section 204. As a result, the application running on the host computing system can more efficiently use the memory heap 200.

In an operation 465, the unused memory section 206 is analyzed to determine if the unused memory section is filled (e.g., has achieved a predefined minimum available unused memory section size). If the unused memory section 206 is not filled to the preselected limit and as a result of the referenced objects being shifted to the tenured section 202 in operation 460 above, the entire young section 204 is available for use and the method operations continue in operation 410 above.

If the unused memory section 206 is filled to the preselected limit, then the method operations continue in an operation 470. In operation 470, the tenured section 202 is analyzed and any objects in the tenured section that are no longer referenced are deleted.

In an operation 475, the referenced objects remaining in the tenured section 202 are shifted to the first portion of the tenured section and the method operations then continue in operation 410 as described above.

As described above, the improved garbage collection schemes described in FIGS. 1-5D allows more efficient allocation and use of the memory heap. By way of example, in a gaming application, many objects have a relatively very short lifespan (e.g., referenced only once or twice) and a few of the objects have a relatively very long lifespan (e.g., are referenced substantially continually) as long as the gaming application is running. As a result, the short lifespan objects can be readily accessed from the faster portion of the memory heap allocated to the young section 204. As the lifespan of the object grows, the object can be shifted to slower access speed memory allocated to the tenured section 202. Allocating the memory heap 200 in this manner allows the gaming application to run more efficiently.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in any of the above figures are not required to be performed in the order illustrated, and that all the processing represented by the operations may not be necessary to practice the invention. Further, the processes described in the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the details and figures given herein and the appended claims.

What is claimed is:

1. A method of managing a memory heap in a computer system comprising:

allocating a first portion of the memory heap as a young section, the first portion having a faster access time than a second portion of the memory heap, the first portion and the second portion being discontiguous, wherein the young section has a fixed beginning memory address in the first portion, wherein a first virtual memory address in the first portion has a higher virtual address than a virtual memory address in the second portion;

allocating the second portion of the memory heap to a tenured section;

allocating a third portion of the memory heap to an unused section; filling the young section with objects from an application after the first portion has been allocated as the young section; and applying a garbage collection process on the memory heap including:

deleting any objects in the young section that are no longer referenced; and shifting any referenced objects to a selected one of the tenured section or a beginning of the young section.

2. The method of claim 1, wherein deleting any objects in the young section that are no longer referenced includes analyzing the memory heap to determine if the unused section is filled, wherein if the unused section is filled, then any objects in either of the young section and the tenured section that are no longer referenced are deleted and wherein if the unused section is not filled, then any objects in the young section that are no longer referenced are deleted.

3. The method of claim 1, wherein the young section includes a beginning memory address higher than a last memory address in the tenured section.

4. The method of claim 1, wherein the unused section is filled if the unused section has less than a predefined minimum available unused section size.

5. The method of claim 1, wherein shifting the referenced objects includes shifting the referenced objects to a beginning of the tenured section.

6. The method of claim 1, wherein shifting the referenced objects in the young section to the beginning of the young section includes:

determining if a sufficient space is available in the young section and if the sufficient space is available in the young section, then shifting the referenced objects in the young section to the beginning of the young section; and if the sufficient space is not available in the young section, then shifting the referenced objects to the tenured section.

7. The method of claim 6, further comprising:

determining if the unused section is filled and if the unused section is filled then deleting any objects in the tenured section that are no longer referenced; and shifting the referenced objects to the tenured section.

8. A computer system comprising:

a processor:

a memory heap including:

a first portion of the memory heap;

a second portion of the memory heap the first portion and the second portion being discontiguous;

a third portion of the memory heap, wherein the first portion having a faster access time than the second portion;

a memory management unit capable of mapping a young section to the first portion, wherein the young section includes a fixed beginning memory address in the first portion, wherein a first virtual memory address in the first portion has a higher virtual address than a virtual memory address in the second portion; and computer executable logic for applying an improved garbage collection algorithm on the computer memory system including:

computer executable logic for allocating a first portion of the memory heap as a young section, the first portion having a faster access time than a second portion of the memory heap, wherein the young section has a fixed beginning memory address in the first portion;

computer executable logic for allocating the second portion of the memory heap to a tenured section;

computer executable logic for allocating a third portion of the memory heap to an unused section;

computer executable logic for filling the young section with objects from an application after the first portion has been allocated as the young section;

computer executable logic for deleting any objects in the young section that are no longer referenced; and computer executable logic for shifting any referenced objects to a selected one of the tenured section or a beginning of the young section.

9. The computer memory system of claim 8, wherein the first portion is a cache memory.

10. The computer memory system of claim 8, wherein the memory management unit is capable of managing a plurality of discontiguous memory portions of the memory heap into an apparent contiguous memory heap.

* * * * *